April 26, 1960   C. WEST   2,934,247
TAILORING

Filed Feb. 12, 1958   6 Sheets-Sheet 1

Inventor
Charles West

April 26, 1960

C. WEST 2,934,247

TAILORING

Filed Feb. 12, 1958

6 Sheets-Sheet 6

Inventor
Charles West
by Malcolm W. Fraser
attorney

United States Patent Office 2,934,247
Patented Apr. 26, 1960

2,934,247

TAILORING

Charles West, London, England, assignor to
Sven Fritiof James, London, England

Application February 12, 1958, Serial No. 714,835

Claims priority, application Great Britain
February 14, 1957

12 Claims. (Cl. 223—38)

The present invention relates to a method and apparatus for folding and hot-pressing flexible sheet material.

The invention is particularly, although not exclusively, useful for performing an operation now commonly done in the tailoring trade by hand, namely forming the lapel and front edge of a jacket by turning back the margin of a piece of cloth, along a predetermined fold line, and then pressing the cloth along that line.

Figure 1:
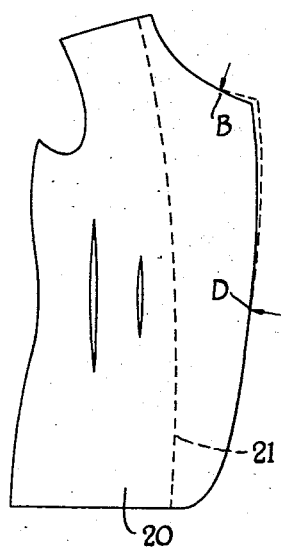
Figure 2:
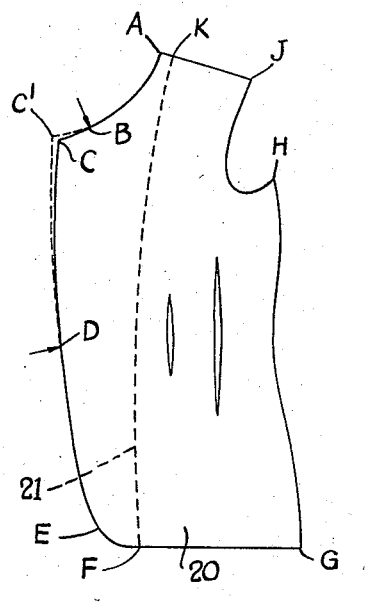
Figure 3:
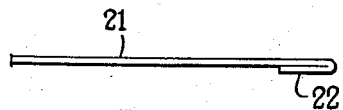
Figure 4:
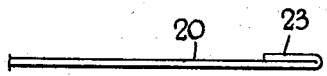
Figure 5:
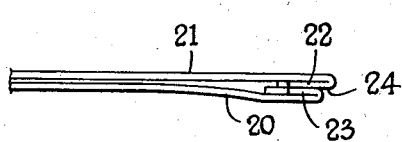
Figure 9:
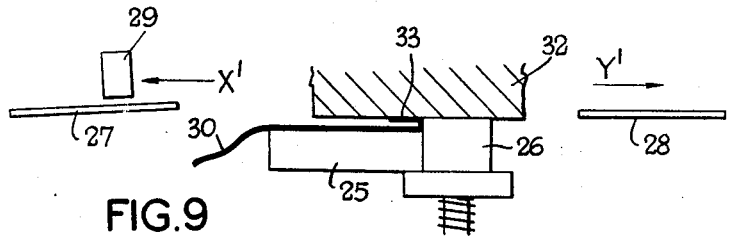
Figure 10:
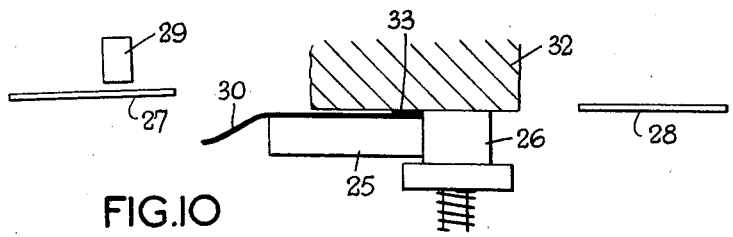
Figure 11:
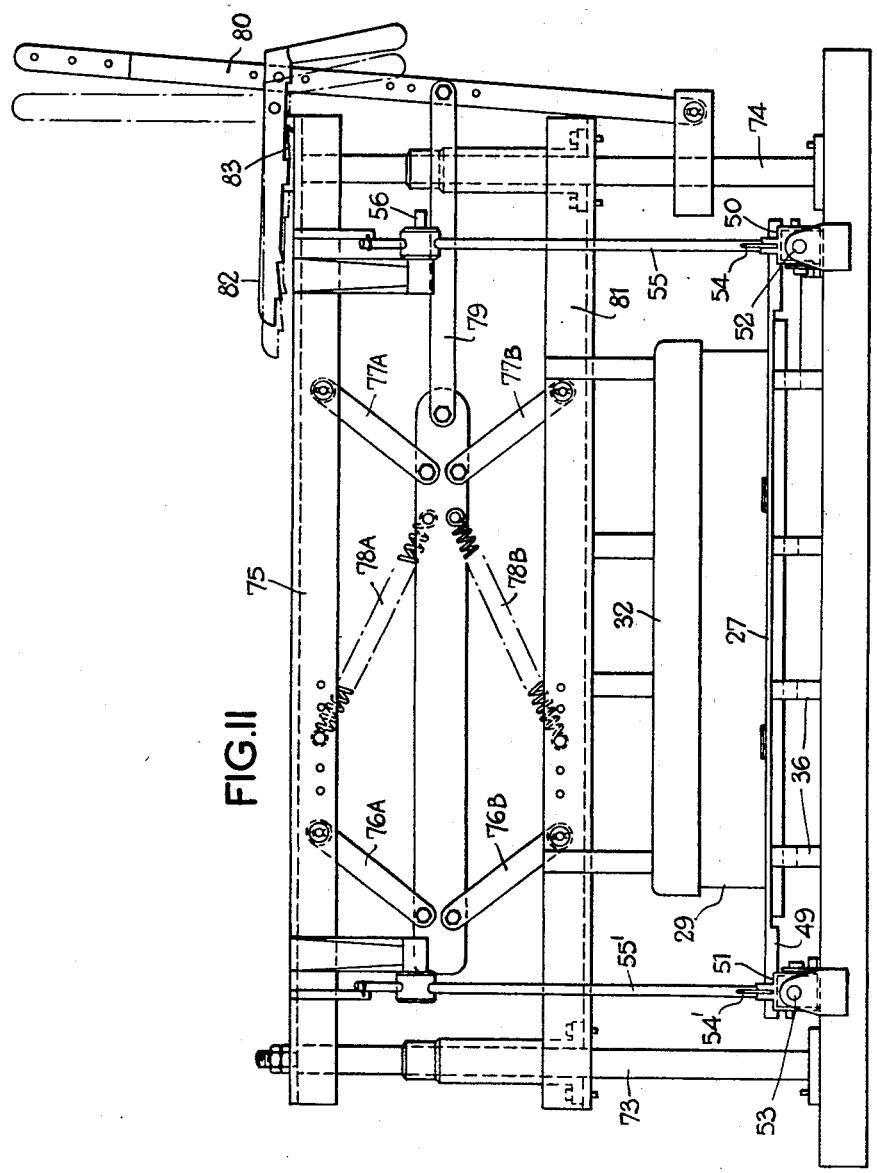
Figure 12:
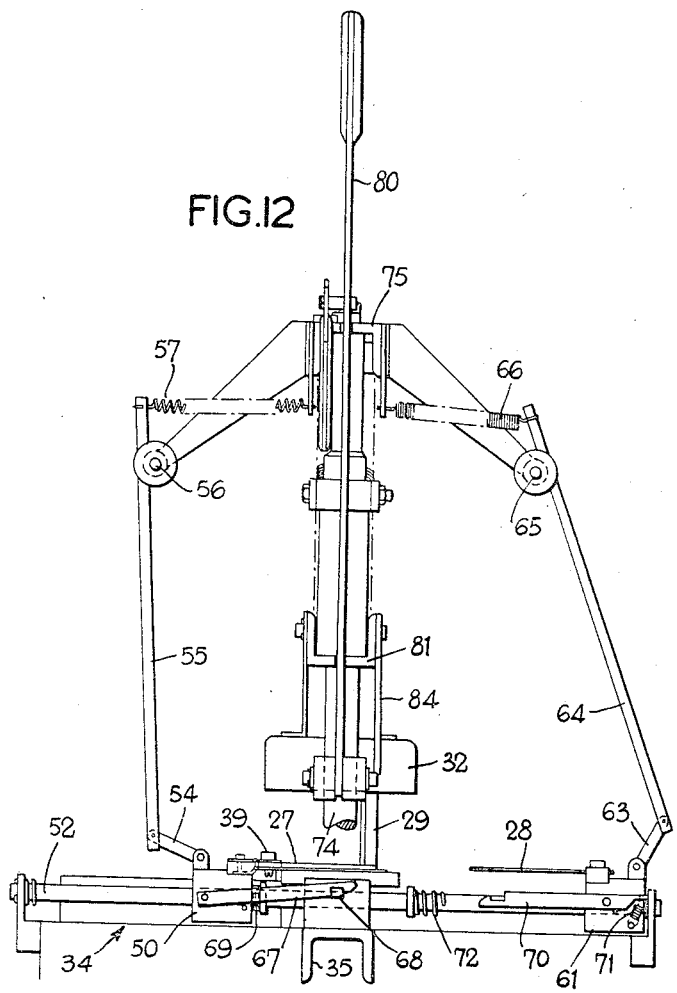
Figure 13:
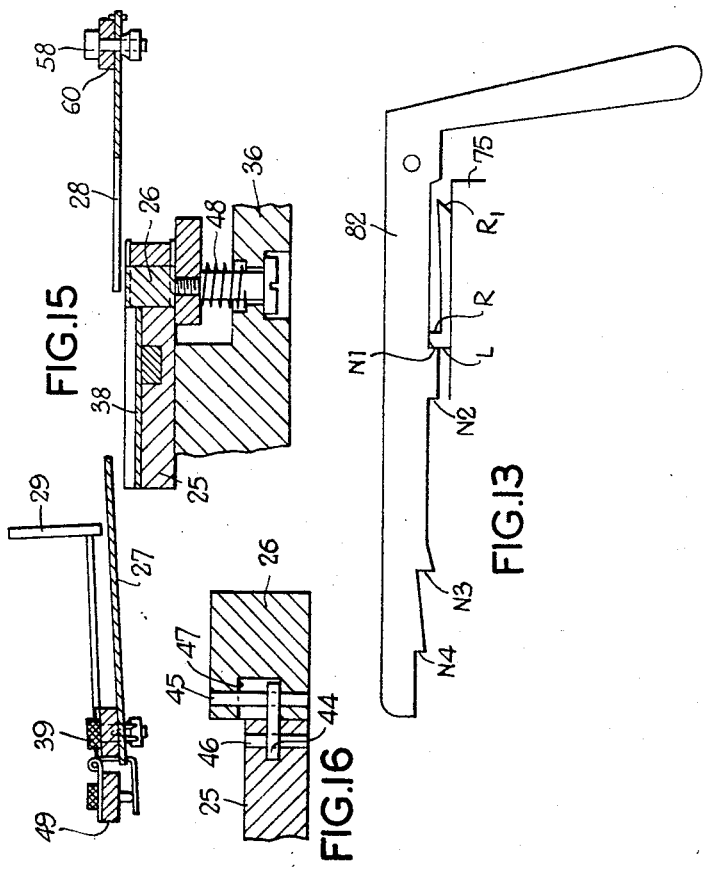
Figure 14:
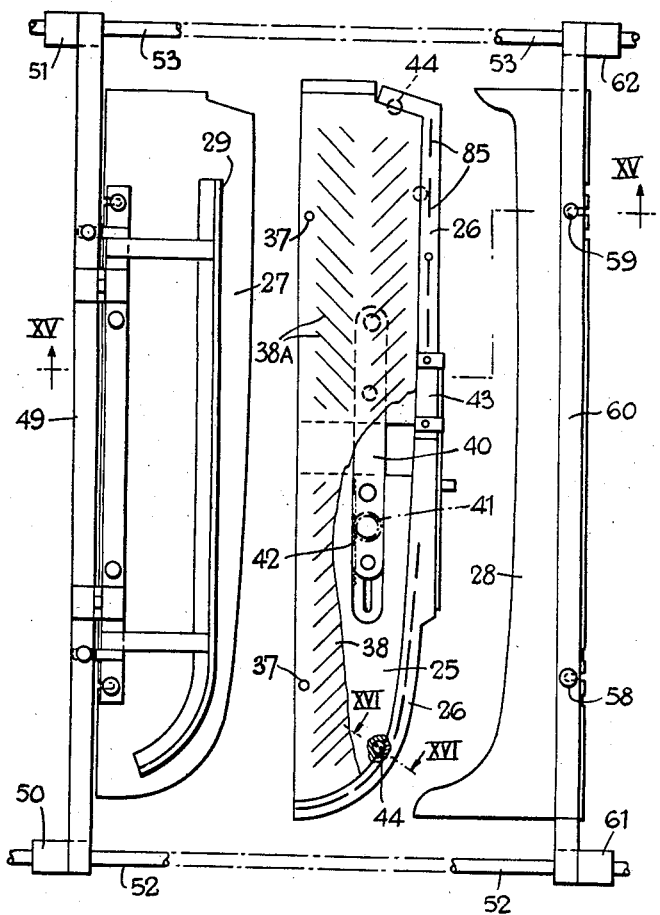

A preferred form of the invention will now be described with reference to the accompanying diagrammatic drawings, in which:

Figures 1 and 2 are respectively the right- and left-hand fore parts and facings of a single-breasted jacket, Figures 3 and 4 show the edges of the facing and forepart folded back, Figure 5 shows the folded edges sewn together, Figures 6 to 10 are similar views in elevation of apparatus with which the edges of the forepart or facing may be folded and pressed to a predetermined curve or straight line, Figure 11 is a side elevation of apparatus for carrying out the folding and pressing operation, Figure 12 is an end elevation of the apparatus of Figure 11, Figure 13 shows a detail of the apparatus of Figures 11 and 12, Figure 14 is a plan view of further parts of the machine, Figure 15 is a section on the line XV—XV of Figure 14, and Figure 16 is a section on the line XVI—XVI of Figure 14.

In Figures 1 and 2 respectively are shown the right-and left-hand front portions of an ordinary jacket. The two halves should be, normally, the mirror images one of the other. Each half consists of a "forepart" 20 defined by the line ABCDEFGHJK and a "facing" 21 defined by the line ABC'DEFK. It will be appreciated that the line AK forms the join at the back of the neck and the peripheral portions BCD and BC'D constitute the lapel and front edge, and so on.

During the making of the jacket, the facing 21 has a margin 22 (Figure 3) of say ¼" width, folded back to lie underneath the main portion of the facing, and the forepart 20 has a margin 23 (Figure 4) folded back to lie above the forepart. Then the two folded back margins are sewn together to form the seam 24 shown in Figure 5, canvas material (not shown) being inserted between the forepart and facing as and where desired.

The operation of folding back the two margins and sewing them together has hitherto usually been done by hand and introduces no particular difficulty where the two edges match one another, i.e. over the peripheral portions AB and DEF. But over the lapel portions BCD considerably more difficulty is introduced.

This operation has been done hitherto by laying the facing on the forepart, so that the right sides of the material are face to face, and then baisting or tacking the facing on to the forepart very thoroughly; considerable skill being required to judge the amount of fullness needed both breadthways, to give the correct roll to the finished lapel, and lengthways to allow sufficient length over the chest and yet not to overdo it and thus create blisters.

The facing margin and the forepart margin are then shrunk together to obtain exactly the same length and are then sewn together with the aid of a sewing machine.

The next step is to trim the edges to within 3/16" of the line of sewing. The seam is opened by hand with an iron on wood. The facing is then turned out to its finished shape and very carefully tacked or baisted along the edge. The degree of quality of the final lapel is dependent on the tailor's skill in respect of correct baisting of the facing on the forepart, straight sewing, very thorough opening of the seams and careful baisting out of the edges.

It is an object of the present invention to provide a machine which will take over at least a portion of these hand operations, insofar as it will fold back the margin of a piece of cloth to lie accurately along a predetermined line, and then press the folded cloth.

The basic idea underlying the present invention is illustrated in Figures 6 to 10. The apparatus here shown comprises an elongate, flat, fixed base-plate 25, a vertically-movable, spring-loaded mould plate 26 which butts against the side of the fixed base plate normally extending well above it, but which can be pressed down to lie very nearly flush with it so as to form an adjustable shoulder lying along the desired fold-line, a die 27 and an infolder 28 both in the shape of thin flat plates. The die 27 carries a removable bar 29. Other views of these members are given in Figures 11 to 16.

The inner edges of the die and infolder both correspond with the desired fold-line, the former having a convex edge and the latter a concave edge, as can be seen in Figure 14.

The apparatus is used in the following way:

A piece of cloth 30 cut roughly to the desired shape, is laid on the fixed base-plate 25 with its margin lying over the step or shoulder 31 formed between the base-plate 25 and the mould-plate 26 (Figure 6), and with its extreme edge in register with a line marked on the mould-plate.

Then the die 27 (carrying the bar 29 with it) is moved in the direction of arrow X (Figure 7) so that it passes over and clear of the cloth 30 until its edge lies above the shoulder formed at the joint of the base-plate and mould-plate. Then an iron 32 is brought down vertically to an intermediate position where it engages the bar 29 which in turn pushes the die 27 down into the position shown in Figure 7 where it forms an approximately right angle bend in the cloth along the shoulder 31 between the base- and mould-plates to produce an upstanding margin 33. The die 27 is held temporarily in this folding position by mechanism to be described later.

Figure 8:
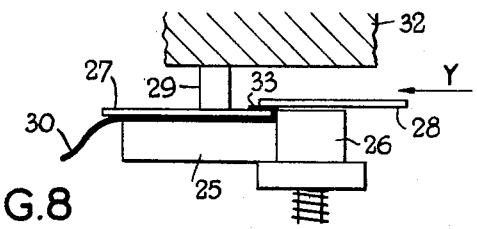

The infolder 28 is then moved in the direction of arrow Y (Figure 8) to push the upstanding edge 33 of the cloth back and lightly down upon the top of the die 27 (Figure 8). At the same time the die 27 is released by the movement of the infolder to allow the die 27 to be retracted in the direction of arrow X' (Figure 9).

Then, as shown in Figure 10, the iron 32 is moved down to a lower position where it alone retains the folded-back margin 33 in its folded position, the infolder 28 being released and spring-retracted in the direction of arrow Y' (Figure 9).

Finally the iron 32 is moved to a lower position (not shown) where it depresses the mould-plate 26 still further and presses the folded-back edge 33 into a permanent fold.

When the iron is lifted the folded and pressed cloth may be removed and the apparatus is made ready for its next operation.

The left- and right-hand foreparts and facings are all dealt with in the same way, although requiring different mould- and base-plates, so as to give the required difference of shape at the lapels and the mirror-image difference between the right- and left-hand portions of the jacket.

In Figures 11 to 16 is illustrated a preferred form of apparatus with the aid of which the invention, the principle of which is illustrated in Figures 1 to 10, may be carried into effect.

The apparatus comprises a table 34 into the top of which is sunk a steel beam 35 lying along the centre of the length of the table. To the beam are screwed steel supports 36 two or more of which are formed with locating holes 37 (Figure 14).

On the supports 36 is removably secured the base plate 25 which in turn has a cover-plate 38 the upper surface of which may be roughened, as shown at 38A in Figure 14 or may have glued to it a piece of fabric. The base-plate and its cover plate are held together by pins 39 fitting in the holes 37.

Although fixed in position during the whole of any single folding and pressing operation the base-plate 25 can be lifted up, turned over and reversed from end to end whenever a mirror-image fold has to be made. When so reversed the base-plate fits into another pair of locating holes (not shown). The mould-plate 26 is reversed with the base-plate.

The base-plate is made extensible so as to accommodate jackets of various lengths, by one or more bridge-pieces 40, each carrying a pinion 41 working in a rack 42 on the base-plate 25. The mould-plate 26 is made similarly extensible with the aid of a bridge-piece 43. Normally the machine accommodates a variety of jackets increasing in length by standard increments and for each of such standard sizes there is provided a separate cover plate 38, 39.

The mould-plate 26 is loosely anchored to the base-plate 25 with the aid of several small discs such as 44 through which are passed a pair of pins 45 and 46 (Figure 16). The disc is fixed in the base-plate 25 and is free to slide, on pin 45, in a slot 47 in the mould-plate 26.

The mould plate is normally held in an up position by springs 48 (Figure 15).

The die 27 is hinged to a bar 49 carrying at its ends blocks 50 and 51 which are slidable on rods 52 and 53, and the floating pressing bar 29 lies normally with its lower face just clear of the resilient die 27. The bar 49 is attached to two pairs of link mechanism 54, 55 and 54', 55' pivoted respectively on the ends of a fixed longitudinally arranged rod 56, the bar 49 being spring-urged into the outer position shown in Figure 14 by a pair of springs one of which is shown at 57. The link mechanism is the same at the two ends of the bar 49.

The infolder 28 is held by quick-operating fasteners 58 and 59, to a bar 60 carrying at its ends blocks 61 and 62 slidable on the rods 52 and 53 respectively. To the blocks are attached links 63, 64 pivoted on the rod 65. These links are similar to those holding the die blocks. Normally the infolder is urged to the outer position shown in Figures 12 and 14 by a pair of springs one of which is shown at 66.

The die block 50 carries a pawl 67 which can engage by gravity a fixed latch 68, the block 50 being urged outwardly by a spring 69. The infolder block 61 carries a pawl 70 normally urged upwardly by a spring 71, and the infolder is urged outwardly by a spring 72.

Fixed to the beam 35 are a pair of uprights 73 and 74 at the top of which is fixed a beam 75. Suspended from the beam 75 is a toggle system comprising links 76A, 76B, 77A, 77B, floating bar 77, springs 78A, 78B, link 79 and handle 80 pivoted at its lower end on the upright 74.

The lower ends of the links 76B and 77B are pivoted on a bar 81 upon which is rigidly secured the iron 32.

On the handle is pivoted a catch 82 formed with notches $N^1$, $N^2$, $N^3$ and $N^4$, designed to engage a lug 83 (Figure 13).

At 84 in Figure 12 is shown a finger with which the pawl 70 may be released from the underside of the latch 68.

Preferably the mould-plate 26 is provided with an inset, broken, coloured line 85 (Figure 14) to which the edge of the unfolded cloth is brought at commencement of a folding operation.

The apparatus is used as follows:

The handle 80 is first pushed into the position shown in broken lines in Figure 13, where the notch N' engages the left-hand side L of the lug 83. In this position the links 76 and 77 lie in their most oblique position, and the iron 32 is held in its highest position.

Figure 6:
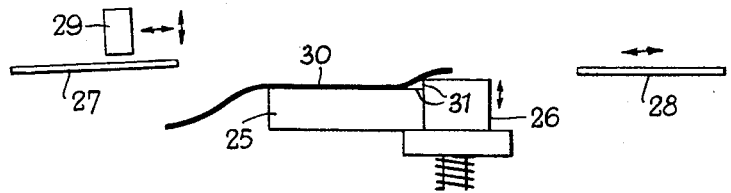
Figure 7:
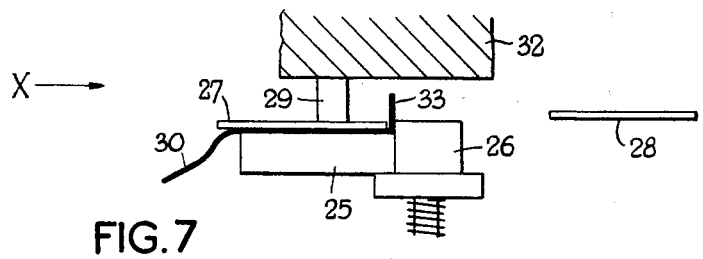

The pairs of links 55, 55' and 64 are withdrawn fully, both pairs then being in the position of the link 64 of Figure 12, and the die 27 and infolder 28 are in the positions shown in Figures 6 and 14.

Cloth having an edge cut roughly to the shape of the desired fold-line is then placed on the mould 25, 26 with its roughly-cut edge in register with the line 85 inset in the mould-plate, this line being parallel with the shoulder 31 formed between the base- and mould-plates.

When this has been done the two links 55 and 55' are gripped and pushed inwardly to cause the die 27 to move under the iron 32 and above the cloth. At the end of this stroke the pawl 67 engages latch 68 and holds the die in place. Then the catch 82 is released and the handle 80 operated to bring the iron into the intermediate position shown in Figures 11 and 12 where the iron presses upon the bar 29 which in turn presses upon the die 27 to cause the latter to press the die into the shoulder 31 and form the turned up margin 33 shown in Figure 7. In this position the notch $N^2$ engages the right-hand side R of lug 83, as shown in full lines in Figure 11.

The links 64 are then gripped and pushed inwardly to cause the infolder to turn down the margin 33 of the cloth, as described with reference to Figure 8. At the end of this movement the nose of pawl 70 on the infolder releases pawl 67 from the latch 68 and then itself engages the underside of the latch under the influence of spring 71.

The handle 80 is then eased to the left with respect to Figure 11 to lift the iron a little so that the die 27 is released and, under the influence of springs 69, returns to its outer position shown in Figure 9.

The handle 80 is then pulled to the right (with respect to Figure 11) into a position where the notch $N^3$ engages the position R' on the lug 83. In this position the iron touches the folded margin 33 of the cloth, but only lightly, so that the infolder is free to return to its outer position. This movement is effected by the finger 84 (Figure 12) which strikes the pawl 70, and releases it from latch 68, just before the iron touches the cloth 33, the infolder being returned to its outer position by the spring 72.

Finally the catch 82 is again released from the lug 83, the handle 80 is pulled to the extreme right and notch $N^4$ is engaged in the position R' on the lug 83. In this position the hot iron is pressing firmly upon the folded cloth.

The usual damping or soaping of the cloth may be used if desired, and the heating of the iron and the time of pressing may be controlled automatically.

With the apparatus described the withdrawal of the die must take place before the iron can be lowered on to the infolder, and the withdrawal of the infolder must take place before the margin can be pressed by the iron, but if means unconnected with the iron be used to press the die on to the material, then the order of withdrawal of the die and infolder become optional.

The thicknesses of the die and infolder are made small so that, before they are withdrawn, the iron can be brought down close to the margin 33. It is a consequence of this that, after they have been withdrawn, the iron is able to preserve the margin in its folded position.

The upper surface of the cover-plate 38 is roughened as at 38A (Figure 14) or has a piece of thin fabric secured to it, or is placed in an envelope of thin fabric in order that, as the die 27 is withdrawn, it will slide over the material without dragging it, whilst the underside of the material is retained by friction in its correct position on the cover-plate 38.

It will be appreciated that where in this specification reference is made to a vertical or horizontal movement, such movement may have a horizontal or vertical movement, respectively, compounded with it. For example, the die 27 may be moved horizontally into a position above the cloth and then vertically downwards on to it, or it may be moved obliquely sideways and downwards on to the cloth.

If desired, the iron may serve as an infolder, in which case it must be capable of moving down towards the material in a diagonal direction, or must be capable of movement both vertically and horizontally.

What I claim is:

1. Apparatus for folding and pressing flexible material comprising a table; a stationary base plate carried by said table and provided with a substantially plane surface and with a curved side face of a shape corresponding substantially to that of the crease in the material to be folded; a mold plate movably mounted on said table for movement in a plane toward and away from said plane surface and provided with a top face, a curved side wall mating with said curved side face and extending above said plane surface to provide a curved ridge facing said base plate; a die movably mounted on said table for sliding movement in the plane substantially parallel to said plane surface, said die having a curved end wall mating with said curved ridge; an infolder movably mounted on said table for sliding movement in the plane substantially parallel to said plane surface and above said top face, said infolder being provided with a curved edge; one operating mechanism for sliding said die between one position adjacent base plate and another position wherein said curved end wall and said die lies closely adjacent to said curved ridge to thereby bend and pinch a portion of the material between said end wall and said ridge; another operating mechanism for sliding said infolder between one position adjacent said mold plate and another position wherein said infolder overlies said mold plate and wherein said curved edge overlaps said curved ridge and extends above said die for engaging and bending the edge of the material above said material between said end wall and ridge; an iron movably mounted on said table for movement toward and away from said plane surface; and interconnecting means between said iron and both said operating means permitting movement of said iron into contact with material on said base plate only when said infolder and said die are both in their respective position adjacent said mold and base plates, whereby said iron moves said mold plate to compress the folded end of the flexible material trapped between said base plate, said curved ridge, and said iron.

2. Apparatus as claimed in claim 1, wherein said iron is provided with a pressing area at least equal to the total area of said plane surface and of said flat top face.

3. Apparatus as claimed in claim 1, wherein said die is pivotally connected to said operating mechanism, and, comprising; a member provided on said iron for urging said die toward said base plate to thereby clamp the material between said die and said base plate.

4. Apparatus as claimed in claim 1, comprising a pawl carried by said die and a latch carried by said base plate, said pawl engaging said latch whereby said die is fixed in position wherein said curved end wall of said die and ridge lie closely adjacent.

5. Apparatus as claimed in claim 1, comprising a pawl carried by said infolder and a latch carried by said base plate, said pawl engaging said latch when said infolder is in said position whereby said infolder is held in position overlapping said mold plate with said curved edge overlapping said curved ridge.

6. Apparatus as claimed in claim 1, comprising a pawl carried by said infolder, a latch carried by said base plate and a finger rigidly carried by said iron, said pawl engaging said latch when said infolder is in said overlapping position whereby said infolder is held in position overlapping said mold plate with said curved edge overlapping said curved ridge, said finger rigidly carried by said iron being operative to release said pawl carried by said infolder before said iron contacts the material above said base plate to permit sliding of said infolder out of the path of movement of said iron.

7. Apparatus as claimed in claim 4, comprising a second pawl carried by said infolder and engageable with said latch to hold said infolder in position overlapping said mold plate, said second pawl being provided with a finger engaging said pawl carried by said die to release said die and permit sliding of said die substantially immediately before said infolder is latched in overlapping position.

8. Apparatus as claimed in claim 4, and further comprising a finger rigidly carried by said iron for releasing said second pawl before said iron contacts the material above said base plate to permit sliding of said infolder out of the path of movement of said iron.

9. Apparatus as claimed in claim 1, wherein said interconnecting means comprises a handle and link mechanism connecting said handle to said iron for moving said iron toward and away from said base plate and to enable movement of said die operating means from the position wherein said curved end wall of die and said ridge are closely adjacent.

10. Apparatus as claimed in claim 9, wherein said die operating means includes resilient means urging said die toward said position wherein said die lies adjacent said base plate.

11. Apparatus as claimed in claim 9, wherein said die operating means includes resilient means urging said die toward said position wherein it lies adjacent said base plate and wherein said resilient means is connected to said infolder operating means to enable movement of the latter from the position wherein said infolder overlies said mold plate with said curved edge overlapping said curved ridge.

12. Apparatus as claimed in claim 11, wherein said infolder operating means includes resilient means urging said infolder toward said position wherein said infolder lies adjacent said mold plate.

References Cited in the file of this patent

UNITED STATES PATENTS

| Number | Name | Date |
| --- | --- | --- |
| 2,394,219 | Vachon | Feb. 5, 1946 |
| 2,609,129 | Goldberg | Sept. 2, 1952 |
| 2,673,666 | Silverman | Mar. 30, 1954 |
| 2,726,020 | Fenby | Dec. 6, 1955 |
| 2,858,967 | Gilbert | Nov. 4, 1958 |